(12) United States Patent
Yamada et al.

(10) Patent No.: US 8,680,164 B2
(45) Date of Patent: Mar. 25, 2014

(54) METHOD FOR RECOVERING A BORON ADSORBENT

(75) Inventors: Arisa Yamada, Yokohama (JP); Hideyuki Tsuji, Yokohama (JP); Shinetsu Fujieda, Kawasaki (JP); Toshihiro Imada, Kawasaki (JP); Tatsuoki Kohno, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/410,667

(22) Filed: Mar. 2, 2012

(65) Prior Publication Data

US 2012/0225957 A1   Sep. 6, 2012

(30) Foreign Application Priority Data

Mar. 4, 2011   (JP) ................. P2011-047979

(51) Int. Cl.
*B01J 49/00* (2006.01)
(52) U.S. Cl.
USPC ........................................ 521/26; 204/520
(58) Field of Classification Search
USPC ............................................. 521/26; 204/520
See application file for complete search history.

(56) References Cited

U.S. PATENT DOCUMENTS

| 7,807,032 B2 * | 10/2010 | Yan et al. | 204/520 |
| 2006/0249390 A1 * | 11/2006 | Yan et al. | 204/520 |

FOREIGN PATENT DOCUMENTS

| JP | 2001-247305 |   | 9/2001 |
| JP | 2002-126543 | * | 5/2002 |
| JP | 2009-240891 |   | 10/2009 |
| JP | 2011-083711 | * | 4/2011 |
| JP | 2011-83711 |   | 4/2011 |

OTHER PUBLICATIONS

N. Kabay, et al., "Removal and recovery of boron trom geothermal wastewater by selective ion excnange resins. I. Laboratory tests", Reactive & Functional Polymers, vol. 60, 2004, pp. 163-170.*
Mebrure Badruk, et al., "Removal of Boron from Wastewater of Geothermal I-'ower Plant by :selective Ion-~-xcnange Resins. I. Batch Sorption-Elution Studies", Separation Science and Technology, vol. 34, No. 13, 1999, pp. 2553-2569.*
N. Kabay, et al., "Removal and recovery of boron from geothermal wastewater by selective ion exchange resins. I. Laboratory tests", Reactive & Functional Polymers, vol. 60, 2004, pp. 163-170.
Mebrure Badruk, et al., "Removal of Boron from Wastewater of Geothermal Power Plant by Selective Ion-Exchange Resins. I. Batch Sorption-Elution Studies", Separation Science and Technology, vol. 34, No. 13, 1999, pp. 2553-2569.
Office Action issued Jan. 29, 2013, in Japan Patent Application No. 2011-047979 (with English-language Translation).

* cited by examiner

*Primary Examiner* — Peter D. Mulcahy
*Assistant Examiner* — Henry Hu
(74) *Attorney, Agent, or Firm* — Oblon, Spivak, McClelland, Maier & Neustadt, L.L.P.

(57) ABSTRACT

The present embodiment relates to a method for recovering a boron adsorbent, including: preparing water having an electric resistivity of 0.01 MΩ·cm or more and kept at a temperature within a temperature range; and contacting the water with the boron adsorbent to release boron adsorbed at the boron adsorbent.

8 Claims, No Drawings

US 8,680,164 B2

METHOD FOR RECOVERING A BORON ADSORBENT

CROSS-REFERENCE TO RELATED APPLICATIONS

This application is based upon and claims the benefit of priority from the prior Japanese Patent Application No. 2011-047979, filed on Mar. 4, 2011; the entire contents of which are incorporated herein by reference.

FIELD

Embodiments described herein generally relate to a method for recovering an adsorbent of boron.

BACKGROUND

The efficient use of water source is required due to the industrial development and population increase. In order to realize the efficient use of water source, it is very important to reuse waste water which requires the purification of water and separation of other substances from water.

On the other hand, boron is widely employed in various technical fields such as semiconductor manufacture, control rod in nuclear power plant and glass manufacture depending on the specific characteristics thereof, and thus becomes a requisite element in high-tech industry. However, boron is harmful for human and causes neurotoxicity and growth inhibition so that the emission regulation of boron is severe.

The World Health Organization (WHO) reconsidered the toxicity evaluation of boron in 1998 and lowered the water quality standard of water supply down to 0.5 ppm. Also, the Water Quality Pollution Control Act was constituted in Japan in 2001 and thus the emission standard was set to 10 ppm or less. Moreover, the purified water to be used in semiconductor manufacturing plant contains an extremely small amount of boron so that the removing technique relating to boron is required.

Boron exists as borate ion in water. As the removing method of boron can be exemplified membrane separation, electrical separation, ion-exchange and coagulation/sedimentation. Among them, particularly, the ion-exchange is widely employed due to the low running cost and low occurrence of sludge. In the ion-exchange method, ion-exchange resin with glucamine chelate as a boron adsorbent is proposed.

In this case, the recovering of the boron adsorbent after the boron adsorbent process is conducted by subsequently contacting the boron adsorbent with an acid and an alkali solution. Concretely, a first recovering liquid containing an agent such as 0.5 N to 1 N-sulfuric acid and a second recovering liquid containing an agent such as sodium hydroxide are prepared. First of all, the boron adsorbent containing the adsorbed boron is treated with the first recovering liquid to release coordinating negative ions from the boron adsorbent and then treated with the second recovering liquid to generate hydroxyl groups on the surface thereof.

According to the aforementioned method, however, in the recovering of the boron adsorbent, since it is required the first recovering liquid and the second recovering liquid are prepared and the boron adsorbent is subsequently treated with the first recovering liquid and the second recovering liquid, two recovering steps are required to complicate the recovering treatment of the boron adsorbent. Moreover, since the first recovering liquid contains the sulfuric acid or the like and the second recovering liquid contains the sodium hydroxide or the like, the thus treated liquid contains sulfate ion and sodium ion in respective high contents in addition to the released boron (i.e., negative ionic compound containing boron). It is therefore very difficult that only the boron is separated, removed and collected from the treated liquid.

DETAILED DESCRIPTION

The present embodiment relates to a method for recovering a boron adsorbent, including: preparing water having an electric resistivity of 0.01 MΩ·cm or more and kept at a temperature within a given temperature range; and contacting the water with the boron adsorbent to release boron adsorbed at the boron adsorbent.

First of all, a prescribed boron adsorbent is prepared and dispersed in waste water containing boron to cause boron to be adsorbed thereat. Alternatively, the boron adsorbent is charged in a predetermined column and the boron in the waste water is adsorbed thereat by passing the waste water through the column.

The kind of the boron adsorbent is not limited only if the boron adsorbent can adsorb the boron, and thus ion-exchange resin with high heat resistance, water resistance and chemical resistance made from polystyrene resin or phenol resin with aminopolyol group can be exemplified.

Since the aminopolyol group capable of adsorbing the boron is appended to the polystyrene or phenol resin via high reactive groups such as epoxy group, hydroxyl group and chloromethyl group, which the reactive groups exist on the surfaces of the polystyrene resin and phenol resin, the boron can be adsorbed at the polystyrene resin or the phenol resin through the ion-exchange of the amino group and the hydroxyl group of the aminopolyol group.

Among the aminopolyol group, since N-methylglucamine group can exhibit high ion-exchange performance, an ion-exchange resin containing the N-methylglucamine group is preferably employed.

Moreover, since the aforementioned ion-exchange resin contain no component which is solved and ionized in water even though the ion-exchange resin is immersed in the water, the ion-exchange resin can contribute the reduction in the contents of ions contained in the treated liquid after the recovery of the boron adsorbent. Therefore, the recovering operation of the boron from the treated liquid can be simplified.

The ion-exchange resin is not limited only if the aminopolyol group is appended to the polystyrene resin and the phenol resin as the skeleton of the ion-exchange resin, and thus glucamine chelate resin and tris (hydroxymethyl) aminomethane chelate resin can be exemplified.

Since the boron to be adsorbed is contained in the waste water as described above, generally, the boron exists as boric acid ($H_3BO_3$) in the acidic region of pH, and as polymer ion such as $B_3O_3(OH)_4^-$, $B_5O_6(OH)_4^-$, $B_3O_3(OH)_5^{2-}$, $B_4O_5(OH)_4^{2-}$ or as four-coordinated ion such as $B(OH)_4^-$ in the alkaline region within a pH range of 7 to 11. With regard to the adsorption on the boron adsorbent, if the boron in the waste water exists as the polymer ion or four-coordinated ion, the reactivity of the boron with the functional groups such as hydroxyl group of the boron adsorbent can be developed and the ion-exchange performance of the aminopolyol group of the boron adsorbent can be also developed. In this point of view, it is desired that the adsorption in the waste water by the boron adsorbent is conducted in the alkaline region within a pH range of 7 to 11. On the other hand, if the boron in the waste water exists as three-coordinated ion, the bonding strength of the boron with the aminopolyol group is weakened so that the boron adsorbed by the boron adsorbent is likely to be released from the boron adsorbent. Generally, the acidic recovering liquid is often employed so as to convert the boron into the three-coordinated ion.

Then, after the boron is adsorbed by the boron adsorbent, the boron adsorbent is recovered.

The recovering of the boron adsorbent is conducted by contacting water having an electric conductivity of 0.01 MΩ·cm or more with the boron adsorbent within a temperature range of 40 to 100° C. Namely, the water heated within a temperature range of 40 to 100° C. and having the electric conductivity of 0.01 MΩ·cm or more is contacted with the boron adsorbent.

The reason of heating the water within a temperature range of 40 to 100° C. is originated from that if the boron adsorbent is contacted with the heated water and then heated within a temperature range of 40 to 100° C., the boron adsorbability of the aminopolyol group, particularly N-methylglucamine group is reduced so that the boron (polymer ion) adsorbed at the boron adsorbent can be easily released therefrom. Generally, when side chains of a polymer are elongated, the polymer is likely to be subject to heat. Therefore, when the functional group such as the N-methylglucamine group having six carbons is heated, the functional group is likely to release the boron therefrom.

Moreover, the adsorptive reaction is inclined to release the adsorbed material under heating condition in view of entropy. As described above, therefore, the adsorbed boron is released from the resin constituting the boron adsorbent such as epoxy resin by contacting the boron adsorbent with the water heated within a temperature range of 40 to 100° C. and then conspicuously released from the ion-exchange resin having long side chain such as N-methylglucamine group by the same manner.

If the temperature of the water is set less than 40° C., the aforementioned effect/function cannot be sufficiently exhibited. If the temperature of the water is more than 100° C., the water is boiled and thus becomes difficult in the use for the recovering of the boron adsorbent although depending on the contents of impurities such as ions contained in the water. In this point of view, the upper limited value of the water is preferably set to about 95° C.

In order to set the temperature of the water to be used in the recovering of the boron adsorbent within a temperature range of 40 to 100° C., the water may be heated by using a heat exchanger or a heater such as a heat pump and heated pipe which are additionally provided, but also may be heated by using waste heat from a facility discharging boron-contained waste water, another disposal facility or a power plant. Alternatively, ground heat is used.

It is required that the water to be used in the recovering of the boron adsorbent has an electric resistivity of 0.01 MΩ·cm or more. The electric resistivity indirectly defines the amount of electrolyte, that is, the ion concentration contained in the water to be used in the recovering. In this case, the amount of electrolyte, that is, the ion concentration contained in the water is indirectly set to a predetermined value by setting the electric resistivity of the water to 0.01 MΩ·cm or more.

Generally, tap water or the like contains calcium ion, carbonate ion, etc., and industrial water or the like contains various ions such as sodium ion, chlorine ion (chloride ion) and sulfate ion in addition to calcium ion and carbonate ion depending on the origin thereof. The calcium ion is a divalent ion but the sodium ion is a univalent ion. Therefore, the amount of electrolyte, that is, the ion concentration contained in the water to be used in the recovering has a difficulty in direct definition, resulting in the aforementioned indirect definition using the electric resistivity.

If the electric resistivity of the water to be used in the recovering is set less than 0.01 MΩ·cm, the amount of electrolyte contained in the water is set more than a predetermined amount and thus the boron to be adsorbed is likely to exist as four-coordinated ion so that the boron adsorbent is likely to adsorb (bonded to) the boron via hydroxyl group, for example. Therefore, even though the water is heated within a temperature range of 40 to 100° C. as described above, the release of the boron from the boron adsorbent becomes difficult.

On the other hand, if the electric resistivity of the water to be used in the recovering is set to 0.01 MΩ·cm or more, the amount of electrolyte contained in the water is set less than the predetermined amount and thus the boron to be adsorbed is likely to exist as three-coordinated ion so that the boron adsorbent is unlikely to adsorb (bonded to) the boron. Therefore, the release of the boron from the boron adsorbent can be enhanced in the synergy effect with the heating of the water within a temperature range of 40 to 100° C.

In view of the aforementioned effect/function, the electric resistivity of the water to be used in the recovering is preferably set to 0.1 MΩ·cm or more.

The upper limited value of the electric resistivity of the water is not particularly limited, and it is considered the amount of electrolyte contained in the water is decreased as the electric resistivity of the water is increased. At the present refining technology, however, the upper limited value of the electric resistivity is about 40 MΩ·cm.

The electric resistivity of the water to be used in the recovering can be measured by a conductance meter (personal SC meter, type name SC-72, made by Yokogawa Electric Corporation).

Since the electric resistivity of the water to be used in the recovering indirectly defines the amount of electrolyte, that is, the ion concentration contained in the water, the electric resistivity can be controlled by adjusting the amount of electrolyte contained in the water. Concretely, the amount of electrolyte can be adjusted by using a filter, an active carbon, a reverse osmosis membrane, an EDI (Electrodeionization ion exchanger) or the like.

In this embodiment, since the lower limited value of the electric resistivity of the water to be used in the recovering, that is, the upper limited value of the amount of electrolyte is defined, fundamentally, the amount of electrolyte is adjusted so as to be set to the upper limited value or less if the amount of electrolyte is beyond the upper limited value. In the case of the use of tap water or industrial water as the recovering water, particularly, since the amount of electrolyte contained in the recovering water is increased, one or more of the aforementioned refining methods may be appropriately selected and employed. For example, the tap water or industrial water is passed through the filter, contacted with the active carbon and passed through the reverse osmosis membrane and the EDI to lower the amount of electrolyte to the predetermined value and then set the electric resistivity to 0.01 MΩ·cm or more.

Since so-called purified water and distilled water is a generic name for water obtained through the aforementioned refining methods, the purified water and the distilled water inherently have the electric resistivity of 0.01 MΩ·cm or more, respectively in many cases.

Moreover, it is desired that the pH of the water to be used in the recovering is set within a range 6 to 8, particularly around 7. This means that the water to be used in the recovering contains no acid and alkali, fundamentally. Therefore, the complicated process of removing boron from the boron adsorbent with the acid and then regenerating hydroxyl groups on the surface of the boron adsorbent with the alkali is not required, different from a conventional recovering method so that the boron adsorbent can be recovered by the simple process of treating the boron adsorbent with the aforementioned water. This simple process is apparent from the recovering process in this embodiment.

In this embodiment, furthermore, since only the water is employed without the acid or alkali in the recovering of the boron adsorbent, the treated liquid obtained through the recovering of the water contains no sulfate ion, sodium ion and the like except contaminated ions such as calcium ion and carbonate ion. Therefore, the boron can be easily released and recovered from the treated liquid.

EXAMPLES

Then, the present invention will be described in detail with reference to Examples.

Example 1

First of all, sodium borate was dissolved in purified water to make a saturated sodium borate solution (7850 ppm) and then 0.5 g of boron adsorbent (Amberlite IRA-743, made by Rohm and Hass Company) made from chelate resin with appended N-methylglucamine was dispersed in 20 ml of the saturated sodium borate solution to cause boron contained in the solution to be adsorbed at the boron adsorbent.

Then, the boron adsorbent was collected from the sodium borate solution and treated with purified water having an electric resistivity of 0.01 MΩ·cm and kept at a temperature of 90° C. for one hour (first recovering process). Then, when the boron concentration of the treated liquid (first treated liquid) obtained through the first recovering process of the boron adsorbent was measured by an ICP (inductively coupled plasma) optical emission spectrometer, it was confirmed that 41% of the adsorbed boron was contained in the first treated liquid. As a result, it was turned out that the boron adsorbent was able to adsorb the boron contained in the sodium borate solution and to be recovered by using the purified water.

Accordingly, the boron adsorbent can be employed in the adsorption of boron again. Practically, when the boron adsorbent was dispersed in a borate solution with the same boron concentration as the aforementioned sodium borate solution to adsorb the boron contained the borate solution, the boron concentration of the borate solution was decreased to 7354 ppm. Also, when the boron adsorbent was washed by the purified water again (second recovering process), it was confirmed that 53% of the adsorbed boron was totally released from the treated liquid (second treated liquid) obtained through the second recovering process and the first treated liquid obtained through the aforementioned first recovering process. It is therefore turned out that the recovering ratio for the boron adsorbent can be changed by adjusting the recovering number and the amount of water to be used in the recovering.

When ions contained in the first treated liquid and the second treated liquid were examined by the ICP optical emission spectrometer, no ions originated from acids and alkalis was recognized.

Example 2

The boron adsorbing process and the boron adsorbent recovering process were conducted in the same manner as in Example 1 except that the temperature of the purified water was set to 50° C. from 90° C. As a result, it was confirmed that 22% of the adsorbed boron was contained in the treated liquid obtained through the recovering process. Moreover, it was confirmed that the boron adsorbent adsorbed almost all of the boron contained in the borate solution and the boron adsorbent was able to be almost perfectly recovered by the purified water. Furthermore, when the boron adsorbing process was conducted again by using the recovered boron adsorbent, the boron concentration of the borate solution was decreased to 7689 ppm. Also, when ions contained in the first treated liquid and the second treated liquid were examined by the ICP optical emission spectrometer, no ion originated from acids and alkalis was recognized.

Example 3

The boron adsorbing process and the boron adsorbent recovering process were conducted in the same manner as in Example 1 except that the temperature of the purified water was set to 95° C. from 90° C. As a result, it was confirmed that 54% of the adsorbed boron was contained in the treated liquid obtained through the recovering process. Moreover, it was confirmed that the boron adsorbent adsorbed almost all of the boron contained in the borate solution and the boron adsorbent was able to be almost perfectly recovered by the purified water. Furthermore, when the boron adsorbing process was conducted again by using the recovered boron adsorbent, the boron concentration of the borate solution was decreased to 7312 ppm. Also, when ions contained in the first treated liquid and the second treated liquid were examined by the ICP optical emission spectrometer, no ion originated from acids and alkalis was recognized.

Example 4

The boron adsorbing process and the boron adsorbent recovering process were conducted in the same manner as in Example 1 except that the electric resistivity of the purified water was set to 0.1 MΩ·cm from 0.01 MΩ·cm. As a result, it was confirmed that 43% of the adsorbed boron was contained in the treated liquid obtained through the recovering process. Moreover, it was confirmed that the boron adsorbent adsorbed almost all of the boron contained in the borate solution and the boron adsorbent was able to be almost perfectly recovered by the purified water. Furthermore, when the boron adsorbing process was conducted again by using the recovered boron adsorbent, the boron concentration of the borate solution was decreased to 7351 ppm. Also, when ions contained in the first treated liquid and the second treated liquid were examined by the ICP optical emission spectrometer, no ion originated from acids and alkalis was recognized.

Comparative Example 1

The boron adsorbing process and the boron adsorbent recovering process were conducted in the same manner as in Example 1 except that the temperature of the purified water was set to 38° C. from 90° C. As a result, it was confirmed that 3% of the adsorbed boron was contained in the treated liquid obtained through the recovering process and the boron adsorbent was imperfectly recovered by the purified water. Furthermore, when the boron adsorbing process was conducted again by using the recovered boron adsorbent, the boron concentration of the borate solution was decreased to 7849 ppm, which means that the recovered boron adsorbent was not able to absorb another boron as compared with the first boron adsorbing process. Also, when ions contained in the first treated liquid and the second treated liquid were examined by the ICP optical emission spectrometer, no ion originated from acids and alkalis was recognized.

Comparative Example 2

The boron adsorbing process and the boron adsorbent recovering process were conducted in the same manner as in Example 1 except that the electric resistivity of the purified water was set to 0.003 MΩ·cm from 0.01 MΩ·cm. As a result, it was confirmed that 13% of the adsorbed boron was contained in the treated liquid obtained through the recovering process and the boron adsorbent was imperfectly recovered by the purified water. Furthermore, when the boron adsorbing process was conducted again by using the recovered boron adsorbent, the boron concentration of the borate solution was decreased to 7801 ppm, which means that the recovered boron adsorbent was not able to absorb another boron as compared with the first boron adsorbing process. Also, when ions contained in the first treated liquid and the second treated liquid were examined by the ICP optical emission spectrometer, no ion originated from acids and alkalis was recognized.

Comparative Example 3

The boron adsorbing process was conducted in the same manner as in Example 1 and the boron adsorbent was collected from the borate solution. The collected boron adsorbent was immersed in 1N-sulfuric acid solution for one hour and then immersed in 1N-sodium hydroxide solution for one hour. Thereafter, the collected boron adsorbent was taken out so that the boron concentrations in the sulfuric acid solution and the sodium hydroxide solution were measured. As a result, the existence of boron was recognized only in the sulfuric acid solution. Also, when ions contained in the sulfuric acid solution was examined by the ICP optical emission spectrometer, sulfate ions and borate ions were recognized.

After the recovering of the boron adsorbent, the recovered boron adsorbent was dispersed in the borate solution again. As a result, it was confirmed the boron was adsorbed at the recovered boron adsorbent accompanied by the release of the adsorbed boron.

In this manner, in the examples according to this embodiment, the boron adsorbed at the boron adsorbent can be almost perfectly released only by the use of the water having the defined electric resistivity and kept at the defined temperature and thus almost perfectly recovered, as apparent from the examples and the comparative examples. Namely, the boron adsorbent can be recovered by the extremely simple method.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A method for recovering a boron adsorbent, comprising:
contacting water having an electric resistivity of 0.01 MΩ·cm or more and kept at a temperature within a temperature range
with a boron adsorbent comprising adsorbed boron to release at least some of the adsorbed boron,
wherein the boron adsorbent comprises an ion-exchange resin having an aminopolyol group and the water has a pH of 6-8.

2. The method as set forth in claim 1, wherein the water is contacted with the boron adsorbent within a temperature range of 40° C. to 100° C.

3. The method as set forth in claim 1, wherein the pH value of the water is 7.

4. The method as set forth in claim 1,
wherein the ion exchange resin is a polystyrene resin or phenol resin having an aminopolyol group.

5. The method as set forth in claim 4, wherein the aminopolyol group is an N-methylglucamine group.

6. The method as set forth in claim 1, wherein the water is kept at the temperature by using waste heat.

7. The method as set forth in claim 1, wherein the aminopolyol group is an N-methylglucamine group.

8. The method as set forth in claim 1, wherein:
the water is contacted with the boron adsorbent within a temperature range of 40° C. to 100° C.;
the ion exchange resin is a polystyrene resin or phenol resin having an aminopolyol group; and
the aminopolyol group is an N-methylglucamine group.

* * * * *